Figure 7:
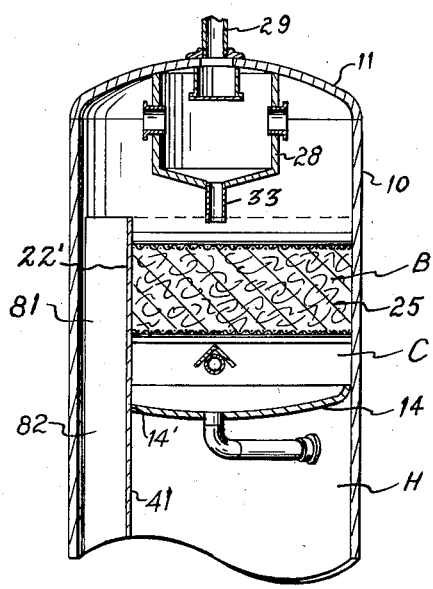

Oct. 21, 1952 — J. P. WALKER ET AL — 2,614,649
METHOD OF AND APPARATUS FOR TREATING OIL WELL STREAMS
Filed Sept. 13, 1950 — 3 Sheets-Sheet 1
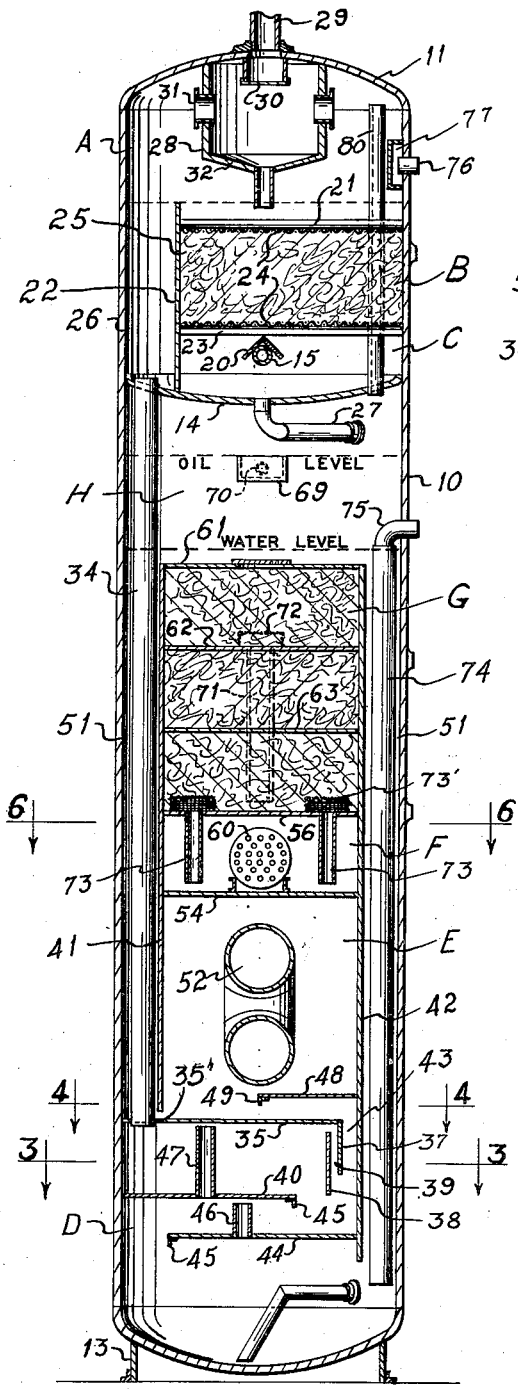
JAY P. WALKER
CLARENCE O. GLASGOW
INVENTORS
ATTORNEYS

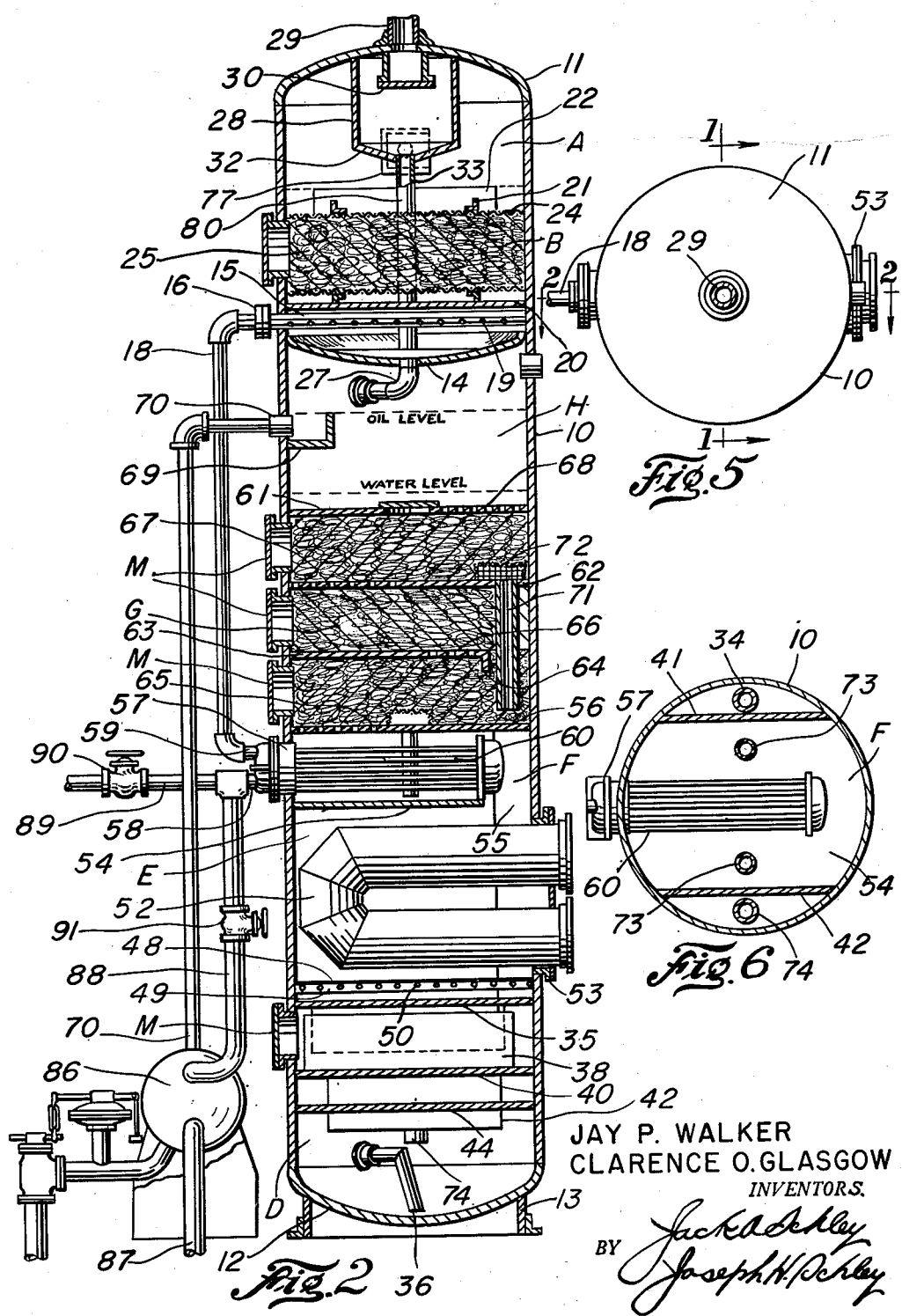

Oct. 21, 1952   J. P. WALKER ET AL   2,614,649
METHOD OF AND APPARATUS FOR TREATING OIL WELL STREAMS
Filed Sept. 13, 1950   3 Sheets-Sheet 3

JAY P. WALKER
CLARENCE O. GLASGOW
INVENTORS.

BY *Jack A. Achley*
*Joseph H. Achley*

ATTORNEYS

Patented Oct. 21, 1952

2,614,649

UNITED STATES PATENT OFFICE 2,614,649

METHOD OF AND APPARATUS FOR TREATING OIL WELL STREAMS

Jay P. Walker and Clarence O. Glasgow, Tulsa, Okla., assignors to National Tank Company, Tulsa, Okla., a corporation of Nevada Application September 13, 1950, Serial No. 184,652

36 Claims. (Cl. 183—2.7)

This invention relates to new and useful improvements in methods of and apparatuses for treating oil well streams.

This application is filed as a continuation-in-part of our co-pending application, Serial No. 628,164, filed November 13, 1945, now abandoned.

One object of the invention is to provide an improved method of degassing and dehydrating oil well streams which include oil, gas and water and wherein the oil may be emulsified or wherein the oil may carry water in the form of dispersed small particles or droplets of water suspended therein. In types of oil which are highly viscous, a portion of such oil may be emulsified, while in another portion the water may be in suspension and so dispersed in the oil that it will not settle out unless treated.

Gas being a troublesome factor in the treatment of oil well streams, where dehydration is involved, it is highly desirable to degas the stream or flow at an early stage in the method. Agitation is the prime mover in the formation of emulsions and gas is an agitator. Gas is also the cause of foaming which retards emulsion breaking. Where a proportionate excessive volume of gas is contained in the well stream, it may be desirable to first pass the stream through an ordinary oil and gas separator and carry off the excess volume of gas or the major portion thereof, before practicing the method herein set forth. However, even after such separation, varying quantities of gas will remain in the stream and thus, in the initial stages of the method it is highly advantageous to degas said stream. It is therefore, an important object of the invention to liberate and carry off gas to remove it as a troublesome factor, but not to such an extent as to materially lower the gravity of the ultimately recovered oil.

An important object of the invention is to provide an improved method and the means for carrying out the same, wherein the influent stream is preheated to the proper degree so that a requisite amount of gas is released, prior to the initial separation, whereby during the initial separation step this released and other free gas is separated and carried off from the stream, which reduces, if not substantially eliminates, foaming to the point where the oil stream may be subsequently handled without impedance.

Another object of the invention is to discharge the well stream into a body of liquids, which may be more or less warm and flow the components of the stream upwardly through said body and also, obstructing or retarding such flow to obtain any or all of the following results: to break up gas-oil bodies or globules, whereby gas is released or liberated and passes upwardly to the top of the liquid body and escapes through a stratum of oil floating upon said body of liquids and also, whereby gas-oil bodies not broken upon reaching the top of said liquid body will be broken and additional gas liberated; to the end that the desired volume of gas will be liberated or carried off and foaming is reduced to a minimum if not entirely eliminated; to more or less break down some of the emulsion; to cause coalescence of the water particles or droplets, whereby larger or heavier water drops are formed which readily precipitate from the oil as free water, thereby entraining such precipitated water with the free water flowing with the stream so that it will subsequently settle out with the free water as such.

A further object of the invention is to overflow, by volume, from the said body of liquids, the entire liquid input of the well stream from which gas has been liberated and subsequently settle out the free water at the lower portion of the unit. By conducting the entire volume of liquid input from the upper portion of the unit, after the preliminary treatment, certain advantages are obtained. In treaters where free water is separately carried off from the treater at the top thereof, oil is likely to be carried out by the water, particularly where the well stream is discharged below a filter or baffles. By taking off all of the water at the bottom of the unit, a more economical structure is had. More efficient defoaming is procured by liberating the gas within the body of liquids in the upper chamber. By conducting all of the oil to the settling chamber and spreading the oil therein, a more effective dehydration step is performed.

A very important object of the invention is to trap and spread the liquids discharged into the body of liquids maintained in the lower portion of the unit, such liquids being predominately water, particularly at the bottom of said unit. The liquids are discharged into a zone or settling chamber which has a higher temperature than that of the body of liquids at the top of the unit. While a large portion of the free water discharged into the settling chamber will readily settle to the bottom of the chamber, by spreading and baffling in the presence of heat, additional free water will be precipitated and emulsified oil will be broken down to varying degrees, whereby both the liquid load and the heat load in the washing chamber may be materially reduced.

Further, oil may be skimmed off the settling chamber which will be much cleaner and may be the cleanest oil, in that it will contain a lower percentage of water.

Still another object of the invention is to provide an improved method of dehydrating well streams containing contaminated oil and gas wherein the components of the well stream are discharged into a previously collected body of liquids and said components are caused to flow through said body and the flow interrupted, as by baffling or filtering, together with the steps of overflowing from said body a volume of liquids equal to the input volume thereof, settling out free water and washing the contaminated oil in a body of heated water, whereby a washing of the components in a relatively large area is accomplished which makes for a more uniform heat exchange and dispersion and more efficient liberation of gas from the foaming phase and thus the well stream being adequately degassed, such steps not only minimize foaming, but render the collected body of liquids more quiescent and prepare the overflowing liquids for an efficient settling out of the free water at the bottom of the vessel. To these steps may be added a partial dehydration of the oil flowing through the collected body of liquids as well as the preheating of the components to aid in degassing and dehydration.

In summation, the prime object of the invention is to provide a continuous dehydrating method wherein an oil-gas-water well stream is processed to liberate and carry off gas, to some degree coalesce water droplets, with or without breaking down some emulsion; then conducting all of the input liquids by volume to a settling chamber containing a body of more or less warm liquids, predominately water, wherein free water is settled out and emulsified or contaminated oil is trapped and spread to precipitate additional free water; then the dehydrated oil is skimmed off and conducted through a heated washing step for further dehydration.

Another object of the invention is to provide an improved apparatus for carrying out the method and involving certain new and advantageous features which will be hereinafter pointed out.

A construction designed to carry out the invention will be hereinafter described together with other features of the invention.

Figure 9:
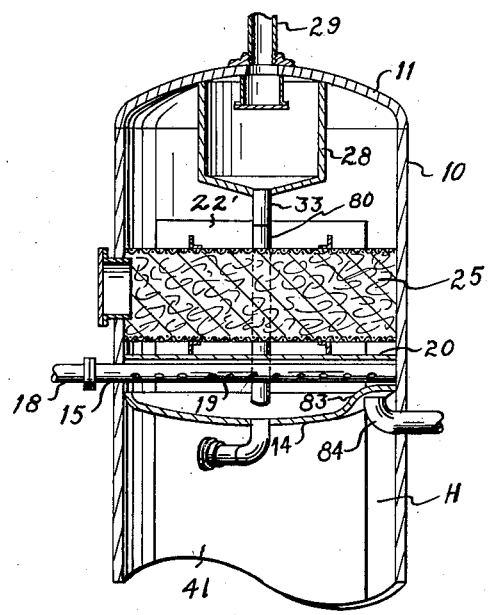
Figure 8:
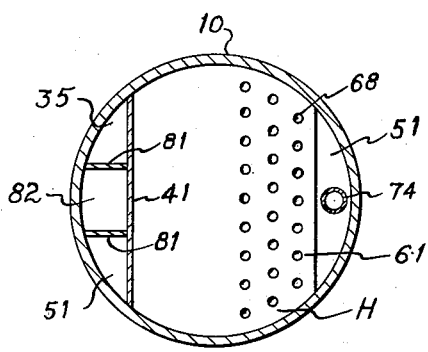

The invention will be more readily understood from a reading of the following specification and by reference to the accompanying drawings, wherein an example of the invention is shown, and wherein:

Fig. 1 is a vertical sectional view of a treater constructed in accordance with the invention, Fig. 2 is a similar view taken at right angles to Fig. 1, Figs. 3 and 4 are horizontal cross-sectional views taken on their respective lines in Fig. 1, Fig. 5 is a plan view of the treater, Fig. 6 is a horizontal cross-sectional view taken on the line 6—6 of Fig. 1, Fig. 7 is a partial vertical sectional view of a modified form of the invention, Fig. 8 is a horizontal cross-sectional view of the same, and Fig. 9 is a partial vertical sectional view of still another form of the invention.

In the drawings, the numeral 10 designates an elongate upright metal tank, preferably having a crowned top 11 and a dished bottom 12 supported on an annular, flanged base ring 13. A gas extracting chamber A is formed at the top of the tank between the top 11 and a dished bottom or partition 14, suitably secured to the inner annular surface of the tank. Immediately above the bottom 14, an inlet nozzle 15 is disposed transversely across the chamber, entering the tank through the side wall thereof and having a collar 16 on its outer end whereby it may be secured to an inlet pipe 18. This inlet pipe is connected to a suitable preheating means hereinafter described. The underside of the nozzle may be slotted or provided with perforations as indicated in Fig. 1.

In order to obtain wide dispersion and distribution of the influent, an inverted V-shaped baffle 20 is disposed longitudinally over the nozzle so as to cause the dispersed streams to flow under the divergent sides thereof in seeking an upward passage. The baffle has its ends secured to the wall of the tank. At one side of the tank, an overflow partition 22 extends upwardly from the bottom 14 and upper and lower transverse angle bars 21 and 23 are secured to said partition, as well as to the wall of the tank. Between the bars 21 and 23, a suitable filter unit B is supported. This unit may comprise horizontal screens or foraminous members 24 with fibrous or filtering material 25 confined therebetween; such material being wood excelsior, fibrous material, or any other material suitable for the purpose. While the unit B is primarily a filter, the screens 21 and 23 constitute baffles, particularly if the fibrous material is omitted. It will be observed that the partition 22 extends above the filter B so as to provide a stratifying space or area thereabove. The influent, upon entering the chamber A, is discharged from the nozzle 15 and fills the chamber up to the level of the upper edge of the partition 22, from which the liquids overflow into a flume 26 between the partition and the wall of the tank. The partition, co-acting with the tank wall, forms a collection chamber C.

It is pointed out that no provision is made for separately carrying off water from the chambers A or C and it is to be observed that all of the liquids received in the chamber are discharged over the partition 22, except those retained in the collection chamber C; thus the entire volume of input liquids is carried through the chamber C, once the same is filled. In order to clean the bottom 14 and occasionally drain off sediment, a drain pipe 27 extends from the bottom 14 through the wall of the tank, and may be equipped with a suitable valve (not shown). It will be observed that the nozzle 15 extends substantially parallel with the partition 22 and thus, the fluid will be spread by the baffle 20 toward said partition, as well as toward the opposite side of the tank and then flow upwardly in dispersed order through the filter B. The purpose of the filter B is three-fold, it being understood that ordinary baffles (not shown) may be used in some instances. Filtering material, such as wood excelsior or its equivalent, is preferred because of its efficiency in breaking up oil-gas bodies or globules to liberate gas as well as in causing coalescence of dispersed droplets of water in suspension, whereby larger water bodies are formed which are heavy enough to precipitate and agglomerate with the free water; as distinguished from the oil. The purpose of filtering or obstructing the upward flow of the components of the well stream through the body of liquids is to break up the oil-gas bodies, coalesce suspended water droplets, and with some types of oil, to partially break down the emulsion, although such emulsion breaking may in some instances, be of a low degree. By liberating and carrying off the gas agitation is minimized, thus making the body of liquids in chamber C, more quiescent and reducing foaming to a negative point. All of the liquids overflow the partition 22 and all gas which does not remain in solution rises to the upper part of chamber A, where it is scrubbed for the purpose of extracting entrained moisture.

A cylindrical gas scrubber 28 is suspended from the central portion of the head 11, to which it is suitably secured, as by welding. A gas discharge pipe 29 is mounted in the center of the top 11, and a baffle 30 is suspended from the top within the scrubber below said pipe. The scrubber is provided with a plurality of inlet diverters 31, as is best shown in Fig. 1, whereby the influent gaseous streams are caused to whirl or travel circumferentially in the scrubber. The scrubber is provided with a hopper bottom 32, which has a central drain pipe 33 depending therefrom and terminating at or below the level of the partition 22, above the filter B. Any liquids extracted in the scrubber 28 are drained back into the liquids therebelow. By immersing the drain pipe 33, gas is induced to enter the diverters rather than to flow up said drain pipe.

The liquids consisting of contaminated or emulsified oil, free water, and possibly some clean oil, overflow the partition 22, pass down the flume 26 into a down pipe or conductor 34, which has its upper end extending through the bottom 14 in fluid-tight contact therewith. The pipe 34 extends downwardly adjacent the wall of the tank, and has its lower end extending through a horizontal partition 35, in fluid-tight contact therewith. The partition is spaced a substantial distance above the bottom 12 of the tank to form a precipitating or settling chamber D. For removing sediment, a pipe 36 extends from near the bottom of said chamber through the wall of the tank.

It is the purpose to incorporate in the chamber D suitable means for separating free water from the down-flowing liquids as well as to spread and baffle the emulsified oil and thereby give full opportunity for water to precipitate or free itself from the contaminated or emulsified oil, whereby the cleanest oil or oil containing a low percentage of water, is skimmed off for further treatment. Such a means is fully described in the application for Letters Patent filed May 5, 1945, Serial No. 593,724, now Patent 2,474,475, by Clarence O. Glasgow. In the present application a somewhat different structure is illustrated, but any suitable structure could be used.

The partition 35, which extends across the major portion of the tank from the down pipe 34, terminates on the chordal line, a relatively short distance from the opposite tank wall. A transverse apron or skirt 37 depends from the terminating end of the partition and has its ends secured to the tank well.

An upright baffle or weir plate 38 has its ends secured to the tank wall and is spaced a short distance inwardly from the apron so as to extend substantially parallel thereto and to underlie the partition.

The upper edge of the weir plate is spaced a short distance below the partition, as for instance two inches, and the thickness of the stratum of oil which may flow over the top of the plate, is thus determined. A short flume or passage 39 is thus formed between the apron and the plate. The weir plate extends below the lower edge of the apron, thus the oil flows over the upper edge of the weir plate, down the flume 39 and escapes under the edge of the apron, which edge may be serrated if desired to divide the oil into numerous small streams.

It will be seen that the partition 35, apron 37 and plate 38 form an enclosure or hood, whereby the liquids are spread and stratified. It is highly important that the partition be imperforate so that the oil will be compelled to spread out and flow across the tank and not escape before such spreading. As will be hereinafter described, a body of water will be contained in the lower half of the tank and will extend well above the partition 35. Heat being applied to this body of water above said partition, there will be a heat exchange or transfer through said partition from the heated water thereabove to the broad stratum of oil spread out under said partition; also, the water for a substantial distance below the partition will at least be warm.

It is pointed out that because of the heat added to the contaminated oil restrained under the partition 35, such oil will not only release water entrained therewith, but the emulsion will be more or less broken down whereby a percentage of water will be precipitated, according to the character of the contaminated oil or emulsion and the temperatures involved. Obviously, the greater the percentage of water which is separated from the oil prior to the heating step, the less liquid remains to be heated and consequently the heat load is materially reduced.

While the partition 35, apron 37 and plate 38 will be ample to treat certain types of emulsion, it may be desirable to employ additional baffling and spreading means in some instances. Adjacent the level of the lower edge of the plate 38, an intermediate horizontal partition 40 is provided, which extends from the tank on the down-pipe side across the tank to within a short distance of said plate. Above the partition 35, a washing chamber E is defined by vertical plates 41 and 42, respectively. The plate 41 terminates just above the partition 35, while the plate 42 extends down into the settling chamber D and is spaced from the apron 37, in substantially parallel relation thereto to form a passage 43. The upper portion of the skirt 37 and the plate 38 constitute means for segregating contaminated oil below the partition 35 and precipitating water therefrom; while the flume 39 and passage 43 are means for taking off the cleanest oil below the partition and delivering it to the washing chamber.

Spaced below the partition 40 is a horizontal bottom partition 44 which extends from the inner side of the depending plate 42 across the tank toward the down-pipe side, thus the partitions 40 and 44 are disposed in staggered relation. The edges of these partitions may be supported by transverse angle members 45 which act as skimmers. Free water, as such, when discharged from the down pipe 34 will immediately seek to settle to the bottom of the tank, flowing along the partition 40, down onto the partition 44, thence in a reverse direction along the partition 44 and then to the bottom of the tank. All precipitated water will collect upon these partitions and flow with the free water along said partitions.

Some of the water flowing with the free water and water settling upon and under the partitions may have oil entrained therewith and such oil will rise and stratify under the partitions 40 and 44, because of the skimming members 45. To conduct this oil upwardly in a segregated path, a tubular riser 46 extends from the partition 44 upwardly so as to discharge oil immediately under the partition 40. A laterally offset riser 47 extends from the partition 40 and terminates immediately under the partition 35.

Manifestly, the liquids confined under the partition 35 by the plate 38 and apron 37 will vary in their oil-to-water ratios and will stratify accordingly. The stratum restrained between the upper edge of the plate 38 and the partition 35 will have a higher ratio of oil-to-water than the strata therebelow, thus the cleanest oil or oil having the least percentage of water emulsified therewith, will flow into the flume 39 and escape into the passage 43. As the oil rises from one stratum or zone to the next stratum or zone under the partition 35, more and more water will be precipitated or caused to settle out.

A horizontal baffle 48 spaced above the partition 35 extends inwardly from the plate 42 to the central portion of the chamber E. A transverse angle member 49 supports the inner edge of the baffle and its depending leg may be provided with spaced perforations 50, to form a spreader for breaking the emulsion stream flowing along the under side of the baffle, into a multiplicity of small streams. The plates 41 and 42 which define the washing chamber E have their edges secured to the tank wall, whereby channels or passages 51 are formed between the plates and the tank wall.

The down pipe 34 extends through one of these channels. It will be observed that the plate 41 terminates just above the partition 35 so that return liquids flowing down its channel will enter the bottom of the washing chamber; liquids flowing in the channel of plate 42 will be discharged into the lower portion of the settling chamber D. Within the lower portion of the chamber E, a return heater tube 52 is inserted through a manway 53 in the side wall of the tank and may receive a suitable burner in its lower leg; such tubes being common in this art. It will be observed that the spreader 49 is disposed under the heater tube longitudinally thereof so as to cause the upwardly flowing streams from the spreader to engage the bottom of the tube and flow upwardly on each side thereof, whereby such streams are heated and also whereby, the body of liquid contained in the chamber is maintained at a desired temperature.

Immediately above the tube 52, a transverse partition 54 is secured between the plates 41 and 42 and has one end extending to the wall of the tank and its opposite end terminating short of the opposite tank wall to provide a flow opening or passage 55 adjacent the manway 53. A short distance above the partition 54, a plate 56 extends across the tank between the vertical plates. This partition and the plate 56 define a preheating chamber F. At the end of this chamber, opposite the flow opening 55, a manway 57 is provided for receiving the inlet leg 58 and the outlet leg 59 of a preheating coil 60 mounted in the chamber F. A suitable outside, horizontal heat exchanger or preheater 86 is mounted at one side of the base of the tank and an emulsion inlet pipe 87 leads to the end of said preheater. The inlet leg 58 is connected with the preheater 86 by an inlet pipe 88. The outlet leg 59 of the preheater is connected with the inlet pipe 18. Where a lesser amount of preheating is found expedient the outside preheater 86 may be cut out and instead the influent may be delivered to the pipe 88 by way of an influent pipe 89 having a valve 90 which is cut off when the outside preheater is used. A valve 91, in the pipe 88, is cut off when the outside preheater is not used.

While it is highly desirable with certain types of oil to employ the coil 60 in the preheating chamber, the same can be omitted, and the inlet line 18 connected to any suitable preheater or directly to a well line, and preheating thus omitted. By employing the preheating chamber F and the coil 60, much more efficient preheating may be accomplished, because of heat exchange with the liquids contained in said chamber. The chamber being immediately above the heater tube 52 and being immersed in the washing water, it is obvious that a high degree of heat may be imparted to the liquids surrounding the coil; such liquids being predominantly water, although emulsified oil streams pass upwardly through said chamber.

The washing chamber has a horizontal plate 61 at its top, which has its longitudinal side edges secured to the upper ends of the plates 41 and 42 so as to extend therebetween, and its end portions are secured to the tank wall, thus leaving the upper ends of the channels 51 open, as is indicated in Fig. 1. The plates 56 and 61 coacting with the plates 41 and 42 and the tank walls define a filtering section G, which may be filled with wood excelsior, fibrous material, or any other material suitable for the purpose. Spaced apart in the section G are a pair of horizontal partitions 62 and 63. The plate 63 terminates short of the tank wall and has a deep depending flange 64. These plates are provided with perforations 65, 66, 67 and 68, respectively, at their opposite ends, whereby the heated emulsified oil is caused to flow upwardly from the opening 55 across the preheating chamber F and back and forth through the filtering chamber G, before the washed oil can escape into an oil collecting chamber H located between the plate 61 and the bottom 14.

The purpose of the filter chamber is to break up the oil globules and to break down the emulsion. By the alternate disposition of the perforations and the inter-positioning of the partitions 62 and 63, the oil is caused to take a circuitous path through the filtering material and by the time the oil is discharged through the perforations 68, substantially all water will have been extracted, and the emulsion broken so that substantially clean oil will be collected in the chamber H and skimmed off from a box 69 surrounding an oil outlet 70. This box determines the oil level. If the filtering material is of an absorbent nature, some of the water will be absorbed as it is released in the chamber G and such material must be replaced from time to time. Suitable manways M are usually provided for this purpose.

A quantity of water will be extracted from the oil in the chamber G and such water will drain to the plates 63, 62 and 56. A drain pipe 71 extends from one end of the plate 63 to a point just above the plate 56. The filtering material is excluded from entering this pipe by a screen 72 placed over the upper end thereof. A pair of drain pipes 73 extend from the plate 56 downwardly on each side of the coil 60 and terminate just above the partition 54.

In view of the fact that the channels 51 are contiguous to the wall of the tank, there will be a tendency for any water flowing down such channels to cool to some extent. Some of this downwardly conducted water will flow under the lower edge of the plate 41 and into the washing chamber E, whereby its temperature will be raised and the upward flow which results will set up a thermosiphonic circulation. Some of the downwardly flowing water will pass directly into the settling chamber. It is pointed out that the tank being filled with liquid up to the level of the skimming box 69, the flow of liquids will be in the nature of currents and their flow will be somewhat controlled by their relative temperatures.

For conducting extracted water from the tank, a water discharge pipe 74 extends from a point just above the bottom 12 upwardly through the right-hand channel 51 (Fig. 1) on the opposite side from the pipe 34. The upper end of the pipe 74 is closed and an elbow 75 leads through the side wall of the tank to the bottom of a siphon box which is in common use in the art, being clearly shown in Letters Patent of Jay P. Walker, No. 2,297,297, issued September 29, 1942.

As before stated, the preheating chamber F and coil 60 may be omitted and the influent emulsion preheated in any suitable manner or not preheated at all. The coil 60 has the advantage of being close to the heater 52, but it could be located in the hot oil collecting chamber H. While it is preferable to introduce the influent through the nozzle 15, an inlet may be provided in the side wall of the chamber A. Such an inlet would include an inlet collar 76 secured in the tank wall well above the collecting chamber C and equipped with a diverter 77 to cause the influent to travel circumferentially on the inner face of the tank wall. The diverter would be located so that the downward path of the influent from the diverter would end in the chamber C.

It is believed that the operation of the treater will be clearly understood from the description hereinbefore given; however, there are several advantages and important features which should be stressed. When the treater is initially placed in operation, it is customary to fill the chamber C to the water level (top of partition 22) and the tank below, up to the water level, with salt water; thus there is always present in the treaters two bodies of water and these bodies are maintained by additional water separated from the well stream. After the operation is started the water level or oil-water interface in chamber B will lower somewhat, since there will be a layer of emulsified oil floating upon the body of water, due to the fact that the collective area of the chamber C is many times greater than the cross-sectional areas of the inlet and outlet elements 15 and 26. As has been pointed out, no attempt is made to separately take off water from the chamber C and therefore, all of the liquids which are introduced into said chamber overflow into the flume 26 and are carried downwardly by the pipe 34 to the settling chamber. Owing to the area of the collection chamber C, and some heating of the liquids therein, because of the heat below the bottom 14, some emulsion breaking or precipitation of water will occur therein and this will be enhanced by the filter B.

It is pointed out that the provision for reducing foaming is highly important. The influent stream reaching the inside preheater 60 in the zone F just above the heater 52 is thoroughly heated. When the oil is heated its viscosity is lowered so that it releases gas and at the same time water is released from the emulsion. The composite stream which is conducted by the pipe or leg 59 and pipe 18, from the inside preheater to the nozzle 15, is discharged into the chamber A. The released gas immediately passes to the upper portion of the chamber and escapes into the scrubber 28, whereby it is carried off. This is very important, because otherwise, such gas remaining emulsified or mixed with the oil, would produce an excessive amount of foam and consequently the foamy oil in attempting to pass down the pipe 34 would not have sufficient specific gravity to flow down the lower portion of said pipe, discharge therefrom and then flow upward in the tank against the liquid head therein. If the gas was not released from the emulsion, the entire upper end of the treater would be filled with foam and the operation defeated.

The water which is liberated from the contaminated oil will augment the free water which will overflow into the flume with the contaminated oil and the augmented free water entering with such oil, thus, the ratio of free water-to-contaminated oil will be more or less increased during transit of the liquids from the nozzle 15 to the flume 26. Any free gas which enters the chamber A with the well stream will flow upwardly and collect in the upper portion of the chamber A; and due to the preheating of the influent in the chamber F, such influent will have its temperature raised to the point where some gas in the solution or in suspension will be released, and such released gas will flow up and enter the scrubber 28 with the other gas. This operation will result in minimizing foaming of the oil and the liquids will be left more quiescent when the gas is extracted. The filter plays an important role in releasing gas which passes upwardly and escapes into the chamber A above the liquid level of the chamber C. A thin stratum of oil will float on the body of liquids at the overflow level and oil-gas bodies not broken by the filter will, to a large extent, be distorted and broken in passing through said oil stratum.

As above pointed out, the water-to-oil ratio having been more or less stepped up in the chamber C, the free water, when discharged into the settling chamber D, will tend to immediately flow to the bottom thereof or spread out across the tank below the partition 35 and descend. As the oil must flow from the pipe 35 across the tank to the baffle 43, it will not only spread, but will stratify under said partition as hereinbefore pointed out. Substantially all of the free water will settle in the chamber D below the partition 35 and varying quantities of water will be precipitated from the oil stratified under said partition. This will materially reduce the over-all quantity of liquid which would otherwise enter the bottom of the washing chamber E and thus, the heat load will be decreased; also, there will be some emulsion breaking in the chamber D.

As heretofore pointed out, it is essential that the partition 35 be imperforate as well as ample to give sufficient spread to the emulsified oil. If the partition was perforated, then the oil would flow up through such perforations and the benefit of precipitating water would be lost. Much advantage is had by skimming off the oil of lowest water content from the chamber D and delivering this cleanest oil to the washing chamber. The invention has the advantage of a three stage emulsion breaking in a unitary tank since such breaking occurs to some degree in each of the chambers C, D and E.

In the operation of the unit, more or less heat will be evolved in the upper portion thereof. Where the influent liquids are preheated, the temperature of the body of liquids in chamber C may be relatively high or such heating of the liquids may occur, through heat exchange, with the heat arising from the liquids below the partition 14; also the well stream itself may have a relatively high temperature. Consequently, the liquids, flowing down the pipe 34 may have been more or less heated; however, regardless of such preheating, a certain amount of heating may occur by heat exchange with the heated water overflowing into the channel 51, as well as because of the close proximity of the heated body of water in the chamber E. While an appreciable amount of heating of the liquids flowing down the pipe 34 may occur, it is obvious than an increase in the cross-sectional area of this conductor will reflect an increase in the amount of heating and thus, more or less dehydration may accompany the downward flow of the oil.

In Figs. 7 and 8 we have shown a slightly modified form of the invention wherein the down pipe 34 is omitted. The wall 41 is continued upwardly to the top of the collection chamber C to form an overflow wall 22', taking the place of the partition 22. The opening 14' in the partition 14, through which the pipe 34 originally extended, is made rectangular and extends from the wall 41 to the tank wall. A pair of narrow vertical plates 81 have their upper ends secured in the opening 14'. These plates extend down between the wall 41 and the tank through the channel 51 to the partition 35 to form with the tank wall and the wall 41, a down flue 82. Enough of the wall 41 is used to form the bottom of the flue, the remainder of the lower edge of the wall 41 being left spaced from the partition to permit water overflowing from the partition 61 into the channel 51 to enter the chamber E. The hole 35' through which the pipe 34 originally extended is made rectangular to receive the lower end of the flue. By this arrangement heat exchange between the down-flowing liquids and the heated body of water in the chamber E may be obtained through the single wall 41.

In Fig. 9 an arrangement is shown to raise the level of the hot clean oil so as to cause it to contact with the bottom of the partition 14, thereby setting a heat exchange relation with the collected liquids in the chamber C and preheating such liquids. The skimming box 69 and the oil outlet 70 are omitted and an upset 83 is formed in the partition 14 adjacent the tank wall. An oil outlet elbow 84 secured in the tank wall has its upper end extending into the offset, whereby the oil level is raised.

It will be observed that a vertical pipe 80 extends through the chamber bottom 14 and terminates near the top 11. This pipe serves two purposes, one to permit gas flows to equalize pressures above and below the bottom 14 and second, to allow some of the hot gasses to flow up into the chamber A and commingle with the cooler gasses therein, whereby condensates from the hot gasses fall into the liquids in chamber C. Some heating of the liquids in the chamber C may thus be accomplished. Further, cooler gasses will in some instances flow down the pipe 80 and commingle with the gasses or vapors rising from the heated oil. Usually the partition 14 will be relatively cooler than the vapors rising from the hot oil therebelow and such vapors contacting said partition are subjected to condensation, whereby the condensates are precipitated to the oil, thus preserving its gravity.

The terms "clean," "cleaned" and "cleanest" as used herein have relatively different meanings. Clean oil as such is intended to designate oil which has been treated to the point where it would be accepted in the industry as clean oil. The term cleaned is used to designate oil which has gone through one or more cleaning or dehydrating steps. The cleanest oil is relative in that it is the cleanest oil obtainable at a given stage in the method.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. The method of treating oil-gas-water well streams which includes, conducting the stream and discharging it into a body of previously collected liquids, liberating and carrying off gas, overflowing contaminated oil and free water to a confined area, then settling free water in said area and stratifying the contaminated oil in said area and precipitating water therefrom, conducting cleaned oil from said area, washing said oil in a body of heated water, collecting the washed and heated oil upon said body of heated water in heat exchange relation with the first collected body of liquids to heat said collected body of liquids.

2. The method of treating oil-gas-water well streams which includes, accumulating in a body a quantity of the well stream while liberating gas therefrom, coalescing water droplets in said accumulation, conducting contaminated oil and free water from said body and discharging said oil and water downwardly into a confined area containing a body of heated water and therein settling out free water and spreading the contaminated oil in said body of heated water to precipitate water from the oil, stratifying the contaminated oil according to its water content, then flowing off partially cleaned oil, and then washing said oil in said body of heated water.

3. The method of treating emulsified oil well streams which includes, conducting the stream and discharging it into a body of liquids, flowing the components of the stream through said body of liquids and partially breaking down the emulsion, whereby the ratio of free water to emulsified oil is increased, liberating and carrying off gas, flowing all of the emulsified oil and free water discharged into said body of liquids and discharging said oil and water downwardly into a body of heated water, interrupting the flow of said emulsified oil and free water in said body of heated water to cause free water to settle and the emulsified oil to be spread into a stratum and heated, whereby water is precipitated from the emulsified oil, flowing off from said stratum oil, and then washing the oil in said body of heated water.

4. In combination in an oil-gas-water stream treater, a tank having a well stream inlet at its upper end, a collection chamber in the upper end of the tank receiving the liquid components of the well stream, means for carrying off gas from the upper end of the tank, a settling chamber in the lower end of the tank, an overflow conductor leading from the collection chamber to one side of the settling chamber, a washing chamber above the settling chamber, an imperforate partition between the settling and washing chambers, means for segregating contaminated oil below the partition and precipitating water therefrom, and means for taking off the cleanest oil below the partition and delivering it to the washing chamber.

5. The method of treating oil-gas-water well streams which includes, accumulating in a body a quantity of the well stream and liberating gas from the contaminated oil, flowing all of the input free water and contaminated oil from the accumulated body to a confined body of warm water, settling the free water from said flow, temporarily trapping the contaminated oil in a stratum and precipitating water therefrom, and then washing said oil in said body of warm water.

6. The method of treating oil-gas-water well streams which includes, preheating the well stream, accumulating in a body a quantity of the well stream and liberating gas from the contaminated oil, flowing all of the input free water and contaminated oil from the accumulated body to a confined body of warm water, settling the free water from said flow, temporarily trapping the contaminated oil in a stratum and precipitating water therefrom, and then washing said oil in said body of warm water.

7. The method of treating an oil-gas-water well stream which includes, discharging a well stream into a body of previously confined liquids, overflowing the components of said stream upwardly through said body of liquids while obstructing such flow to liberate gas and minimize foaming, overflowing all of the oil and water components discharged by said stream from said body of liquids and discharging said components at one side of a settling area and therein settling out free water in a body of heated water, subsequently washing the oil in an area in said body of heated water above said settling area to further separate water from the oil, and collecting the washed oil.

8. The methd as set forth in claim 7, with the step of preheating the components of the stream.

9. The method set forth in claim 7, with the step of spreading and stratifying in the body of heated water the contaminated oil flowing from said body of liquids and precipitating water therefrom after settling out free water and prior to final washing of the oil.

10. The method set forth in claim 7, with the step of temporarily trapping in the body of heated water the contaminaed oil flowing from said body of liquids and removing water therefrom.

11. The method set forth in claim 7, with the step of flowing the components of the stream through the heated body of water in a segregated path to preheat the same.

12. The method set forth in claim 7, with the steps of collecting the dehydrated oil in a body and condensing the vapors rising therefrom by heat exchange with the input components of the well stream.

13. The method set forth in claim 7, with the step of coalescing water entrained in the oil in the previously collected body of liquids.

14. The method of treating an oil-gas-water stream which includes, discharging a well stream into a body of previously collected liquids in a confined area, flowing the well stream components through said body, overflowing from said area all of the well stream liquids discharged thereinto, conducting the overflowing oil and water through a single body of heated water confined in a settling area and a washing area, settling out free water in the settling area, temporarily trapping the oil between the settling and washing areas and stratifying said oil in said body of heated water to cause additional water to settle out of the oil, flowing trapped oil to the washing area and therein washing the oil in said body of heated water to separate water therefrom, collecting clean oil on said body of heated water, carrying off the clean oil, and carrying off the separated water.

15. The method set forth in claim 14, with the step of preheating the well stream prior to discharging it into the body of collected liquids.

16. The method set forth in claim 14, with the step of conducting the well stream in a segregated path through the body of heated water to preheat said stream prior to discharging into the body of collected liquids.

17. The method set forth in claim 14, with the step of obstructing the flow of the well stream liquids through the body of collected liquids to liberate gas and minimize foaming.

18. The method set forth in claim 14, with the step of obstructing the upward flow of the oil through the body of heated water to break up oil globules and release water.

19. An emulsion treater including, an upright tank closed at its top and bottom, a partition across the upper portion of the tank defining a liquid collecting chamber thereabove, an overflow member above the partition at one side of the collecting chamber, an imperforate partition across the lower portion of the tank dividing the tank into a settling chamber and a washing chamber, a conductor leading down from the overflow member through the lower partition at one side thereof, said lower partition terminating short of one side of the tank to provide a single restricted flow passage between the settling and washing chambers, means below the lower partition for temporarily trapping a stratum of oil in contact with said partition, a heater in the washing chamber above the lower partition, and means for maintaining a body of water in the settling and washing chambers and for discharging separated water from the settling chamber, and means for maintaining an oil level above the water level.

20. An emulsion treater as set forth in claim 19, with an intermediate partition across the tank at the upper end of the washing chamber, and a tubular preheater across the tank above the intermediate partition below the water level.

21. An emulsion treater as set forth in claim 19, with staggered transverse partitions below the lower partition, and an upright wall at one side of the lower and staggered partitions forming a water conductor from the washing chamber to the bottom of the settling chamber.

22. The method of treating oil-gas-water well streams which includes, discharging the well stream into a body of previously collected liquids, flowing components of said stream through said body to liberate gas, overflowing the liquid components from said body in common and discharging said liquid components into a body of heated water at one side of a settling area and settling out the free water, flowing the oil transversely through said body of water during a time lag sufficient to precipitate water from the contaminated oil, then washing the oil in said body of heated water, and collecting the finally washed oil.

23. An oil-gas-water well stream treater including, an upright tank, an upper liquid collecting chamber at the upper end of the tank for holding a body of liquids, means for discharging a contaminated oil well stream into the chamber, means in the chamber in the collected liquids above the well stream inlet for liberating gas, means for overflowing from the chamber the entire volume of the liquid input from the well stream while maintaining a body of liquids in said chamber, a conductor leading from the overflow means for conducting overflowing liquids to the lower end of the tank and discharging said liquids downwardly into said tank, means for maintaining a body of water in the tank below said chamber into the lower portion of which said conductor discharges, whereby free water settles out in the lower portion of said tank, a heater in the tank for heating the body of water, imperforate means below the heater for directing and spreading the oil discharged from the conductor in a common path toward the opposite side of the tank, whereby said oil is temporarily trapped in a stratum, said means having a single oil outlet spaced diametrically across the tank from the conductor, and means in the body of water above the heater for baffling the emulsified oil.

24. In combination in an oil-gas-water stream treater, a tank having a well stream inlet at its upper portion, a cross partition in the upper portion of the tank below said inlet forming a liquid collection chamber above said partition, there being a gas space above the collection chamber, a liquid conductor leading from the collection chamber to the lower portion of the tank, a spreading partition across the lower portion of the tank, said conductor having its discharge immediately below said spreading partition at one side of the tank, a member depending from the spreading partition across the tank from the conductor, whereby contaminated oil discharged under the spreading partition is spread and stratified thereunder and free water is directed downwardly below said spreading partition and also whereby water is precipitated from said spread oil, a heater in the tank above the spreading partition, a water discharge leading from the tank having means for maintaining a water level in the tank above the spreading partition, whereby a body of water is held in the tank and in which body of water at least a portion of the heater is immersed, a passage from the depending member to the tank above the spreading partition, and an oil outlet leading from the tank above the water level.

25. The combination set forth in claim 24, with a well stream preheater in the tank below the oil outlet having a well stream inlet and an outlet conductor connected with the inlet at the upper portion of the tank.

26. The combination set forth in claim 24, and gas scrubbing means in the gas space at the top of the tank.

27. The combination set forth in claim 24, and a transverse filter in the collection chamber above the well stream inlet and below the inlet to the conductor.

28. The combination set forth in claim 24, wherein transverse baffles are disposed in the tank above the heater, filtering material between the baffles, said baffles having staggered openings, whereby upwardly moving oil is caused to take a circuitous path through the filtering material, and a preheater in the tank between the heater and the baffles having a well stream inlet and an outlet conductor connected with the inlet to the collection chamber.

29. The combination set forth in claim 24, wherein the well stream inlet is located in the upright wall of the tank above and spaced across the tank from the liquid conductor, and a diverter at the said inlet for directing the well stream fluid circumferentially in the tank.

30. In combination in an emulsified oil-gas-water stream treater, an upright tank, a cross partition in the upper portion of the tank, an upright overflow partition rising from the cross partition co-acting with the wall of the tank to form an overflow flume, the cross and overflow partitions co-acting with the wall of the tank to form a liquid collection chamber, a liquid inlet in the collection chamber having means for dispersing liquids in said chamber, there being a gas space in the tank above the overflow partition, an imperforate partition extending transversely across the lower portion of the tank, whereby a washing chamber is formed thereabove, means maintaining a body of water in the tank with a level above said transverse partition, a heater in said body of water above said transverse partition, a liquid conductor leading from the flume at the upper end of the tank and discharging at one side of the tank below said transverse partition, whereby the oil is caused to flow and spread across the tank, trapping means at the opposite side of the tank from the conductor for holding a stratum of oil under said transverse partition, whereby water may be precipitated therefrom, a conductor from the trapping means to the washing chamber, an oil outlet from the tank above the level of the water level, and means for carrying off separated water from the tank.

31. The combination set forth in claim 30, and a preheater in the tank immersed in liquid below the cross partition and having an outside liquid inlet and an outlet conductor connected with the inlet in the collection chamber.

32. In combination an oil-gas-water well stream treater, a tank having a stream inlet at its upper end, a collection chamber in the upper end of the tank receiving the liquids of the well stream, means for carrying off gas from the collection chamber, a settling chamber in the lower end of the tank, a conductor leading from the collection chamber to the settling chamber, a transverse heater in the tank above the settling chamber, a washing chamber in the tank extending above the heater, a preheater above the heater disposed across the tank having an influent inlet from the exterior of the tank, a conductor from the preheater to the stream inlet at the upper end of the tank, an oil outlet from the tank below the bottom of the collection chamber, and a water outlet from the tank.

33. The combination set forth in claim 32, with a filter across the tank above the heater and below the oil level.

34. In combination in an emulsified oil-gas-water stream treater, a tank, a gas and liquid separating chamber in the tank, a water outlet from the tank, a washing chamber in the tank separate from the separating chamber and constructed to contain a body of heated water, means for maintaining a water level in the tank, an oil outlet from the tank, a main heater in the washing chamber, an influent emulsion heat exchange conductor in the washing chamber and in the heat zone of the heater, said heat exchange conductor having an elongated passage and having a large expanse of heat transfer area exposed to the washing chamber and being in direct heat exchange relationship with the heated water in said washing chamber, an emulsion inlet to the heat exchange conductor, an emulsion outlet from the heat exchange conductor, a conductor extending from the outlet of the heat exchange conductor to the separating chamber, and an emulsion conductor leading from the separating chamber to the washing chamber.

35. In combination in an emulsified oil-gas-water stream treater, a tank, a gas and liquid separating chamber in the upper portion of the tank, a main heater in the tank spaced below the chamber, a washing chamber in the tank below the separating chamber and constructed to contain a body of heated water, the main heater being constructed to be immersed in the body of water in the washing chamber, a water outlet from the tank, means for maintaining a water level in the washing chamber, an oil outlet from the tank above the water level, an influent emulsion heat exchange conductor in the washing chamber above the main heater and below the oil outlet, said heating conductor having an elongated passage and a large expanse of heat transfer area exposed to the body of heated water and being in direct heat exchange relationship with the water in said washing chamber, an influent conductor to the heat exchange conductor for admitting a foamy oil thereto whereby gas is released and foaming is reduced, a conductor for the gas and liquid stream from the heat exchange conductor to the separating chamber, a gas escape from the separating chamber for carrying off the gas released by the heat exchange conductor and also gas released in the separating chamber, and a conductor extending from the separating chamber and discharging into the washing chamber for delivering gas-free liquids into the water heated by the main heater, whereby overloading the separating chamber with foam is avoided and the oil delivered to the last-named conductor has sufficient gravity to carry it down through the conductor and into the water in the washing chamber.

36. In combination in an emulsified oil-gas-water stream treater, a tank, a gas and liquid separating chamber in the tank, a washing chamber in the tank separate from the separating chamber and constructed to contain a body of heated water, a gas outlet from the separating chamber, a water outlet from the tank, an oil outlet from the tank, a gas outlet from the washing chamber, a heater in the washing chamber below the water level, an influent emulsion heat exchange conductor in the washing chamber and in the heat zone of the heater, the heat exchange conductor having an elongated flow passage and a large expanse of heat transfer area exposed to the body of heated water, said heat exchange conductor being disposed below the water level in direct heat exchange relationship with the heated water in said washing chamber, an emulsion inlet to the heat exchange conductor, an emulsion outlet from the heat exchange conductor, a conductor extending from the outlet of the heat exchange conductor to the separating chamber, and an emulsion conductor from the separating chamber to the washing chamber.

JAY P. WALKER.
CLARENCE O. GLASGOW.

REFERENCES CITED

The following references are of record in the file of this patent:

UNITED STATES PATENTS

| Number | Name | Date |
|---|---|---|
| 2,181,686 | Walker | Nov. 28, 1939 |
| 2,181,687 | Walker | Nov. 28, 1939 |
| 2,297,297 | Walker | Sept. 29, 1942 |
| 2,354,856 | Erwin | Aug. 1, 1944 |
| 2,366,302 | Welch | Jan. 2, 1945 |
| 2,384,222 | Walker | Sept. 4, 1945 |
| 2,457,959 | Walker | Jan. 4, 1949 |